United States Patent
Looser

(10) Patent No.: US 6,752,460 B2
(45) Date of Patent: Jun. 22, 2004

(54) CHAIR

(75) Inventor: Hans Looser, Wangen (DE)

(73) Assignee: Moll System- und Funktionsmöbel GmbH, Gruibingen (DE)

( * ) Notice: Subject to any disclaimer, the term of this patent is extended or adjusted under 35 U.S.C. 154(b) by 0 days.

(21) Appl. No.: 10/247,353

(22) Filed: Sep. 20, 2002

(65) Prior Publication Data

US 2004/0056525 A1 Mar. 25, 2004

(51) Int. Cl.$^7$ .................................................. A47C 1/02
(52) U.S. Cl. ...................................... 297/338; 297/353
(58) Field of Search ........................... 297/353, 440.24, 297/440.1, 338

(56) References Cited

U.S. PATENT DOCUMENTS

| 361,992 | A | * | 4/1887 | Cron |
| 4,269,532 | A | * | 5/1981 | Sorrentino |
| 5,439,269 | A | * | 8/1995 | Cheng |
| 5,547,253 | A | | 8/1996 | Schwartz |
| 5,590,930 | A | * | 1/1997 | Glockl |
| 5,688,067 | A | | 11/1997 | Straub |
| 5,975,635 | A | * | 11/1999 | Parpala |
| 6,302,482 | B1 | * | 10/2001 | Moll et al. |

FOREIGN PATENT DOCUMENTS

| DE | 4417 198 | 11/1995 |
| FR | 1325961 | 3/1963 |

* cited by examiner

Primary Examiner—Milton Nelson, Jr.
(74) Attorney, Agent, or Firm—Browdy and Neimark, P.L.L.C.

(57) ABSTRACT

A chair (1) has a base (2) and upwardly projecting from the base (2) a supporting column (6) holding a seating device (7). Disposed on the base (2) is a plug-type connection piece (19). The supporting column (6) is slipped onto the onto the plug-type connection piece (19) and secured on the plug-type connection piece (19) in a manner so that it is detachable from the outside.

13 Claims, 2 Drawing Sheets

CHAIR

The present invention is concerned with a chair having a base and a supporting column upwardly projecting from this base to hold a seating device, specifically in a vertically adjustable manner.

One chair of this type that is known in practice represents an unchangeable unit and is stored by the manufacturer and supplier as a whole unit and also transported as such by the customer. This requires a relatively large amount of space.

The invention, therefore, has as its aim to create a chair, which, if desired, will take up less space during storage and transportation.

This aim is met according to the invention in such a way that a plug-type connection piece is disposed on the base and the supporting column is slipped onto this plug-type connection piece, said supporting column being secured on the plug-type connection piece in such a way that it is detachable from the outside.

The supporting column thus is removable from the base. When disassembled in this manner, the chair is less bulky so that it can be stored and transported more easily. The assembly, since it is performed from the outside, can be carried out by the customer.

Convenient developments of the invention, which address above all the stability of the connection between the base and supporting column, as well as a simple assembly and production, are defined in the subclaims.

One embodiment of the invention will now be described with the aid of the drawing, in which.

Figure 1:
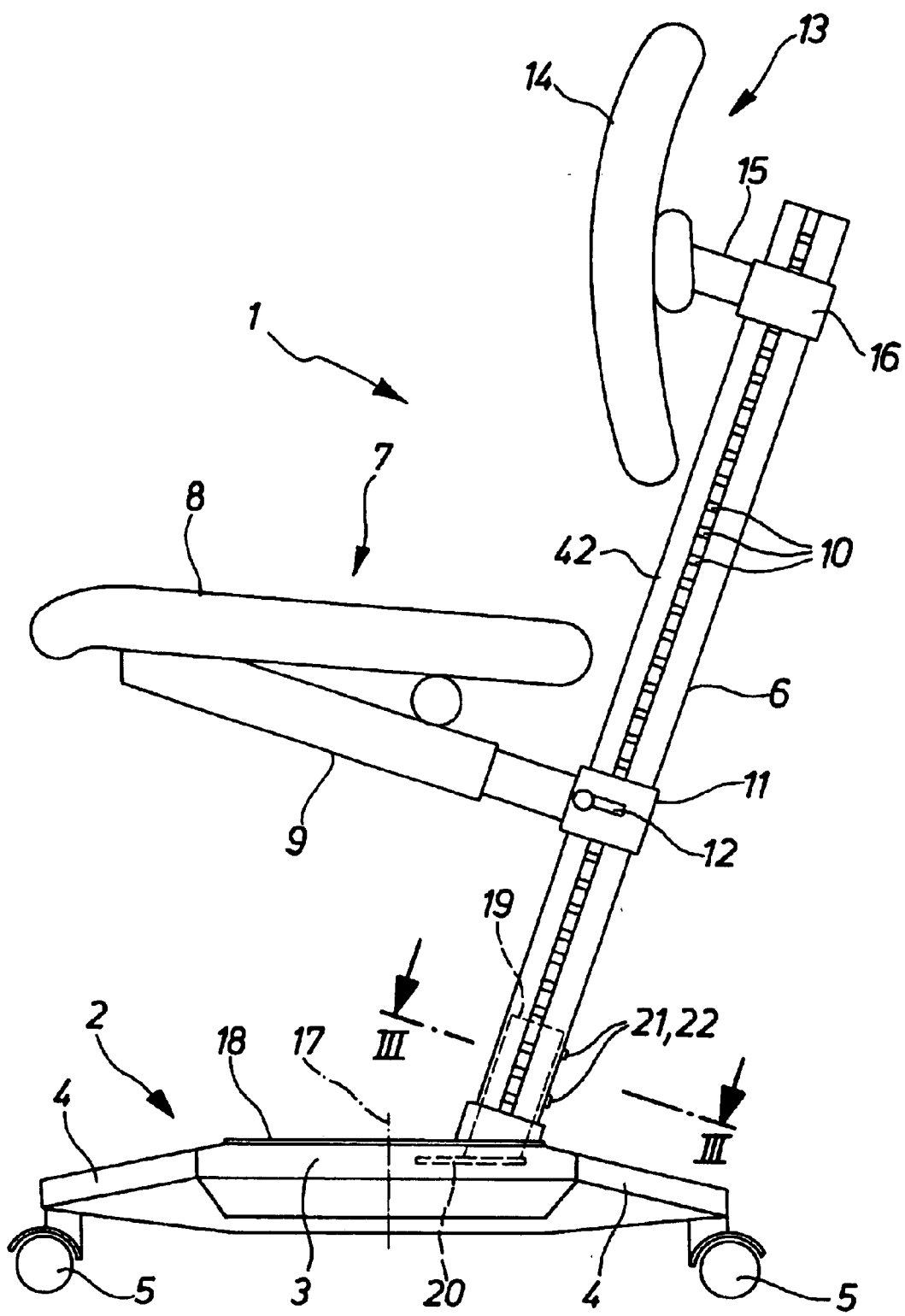
FIG. 1 shows an inventive chair in a schematic side view.

The chair 1 that is shown in its entirety in FIG. 1 comprises a base 2, the exact look of which is of secondary importance in the present context. In the presented embodiment it has a central body 3 that is disk-shaped in the top view, from which holding arms 4 project in a radial direction, each with a pivotable roller 5 disposed on its underside, so that the chair can be moved around on the surrounding floor. In FIG. 1 only two of the actual five rollers have been drawn in.

In the rear portion of the chair a supporting column 6 projects upward from the base 2. The supporting column 6 holds a seating device 7 in such a way that the actual seat 8 is disposed on a fastening arm 9 of the seating device 7, said fastening arm 9 being connected to the supporting column 6 in a manner so that it is vertically adjustable along the supporting column 6. The vertically adjustable connection may be attained in various ways. In the presented chair the supporting column 6 has a series of lateral locking holes 10 extending along its length, in which the fastening arm 9 can be locked. The fastening arm 9 has a connection sleeve 11 that encompasses the supporting column 6 like a collar and has an actuating lever 12 supported on it, which, on its underside facing away from the observer, has a locking member that extends through the connecting sleeve 11 and interacts with the locking holes 10.

Also provided on the supporting column 6, above the seating device 7, is a back rest device 13 with a back rest 14, against which a person seated on the seat 8 can rest her back. The back rest 14 is connected to the supporting column, similarly to the seat 8, with a fastening arm 15 and a connecting sleeve 16 that is slipped over the supporting column 6 and adjustable to a desired height.

The supporting column 6 has a linear shape so that the seating device 7 and the back rest device 13 can be conveniently adjusted along the entire length of the supporting column 6. The supporting column 6 projects upward from the base 2 with a backward slant. However, this could also be different.

The base 2 incorporates a pivoting member 18 that is pivotable around the central axis 17 of the base 2. The supporting column 6 is connected to the pivoting member 18 eccentrically to the central axis 17 so that it performs a circular motion around the central axis 17 when the pivoting member 18 is rotated. This allows the person who is seated on the chair to change her seating direction.

The presented chair 1 can be disassembled so that it is less bulky for storage and transportation. For this purpose the base 2 has a plug-type connection piece 19 that projects upward over a short distance in the longitudinal direction of the supporting column 6 and to which the supporting column 6 is connected. The supporting column is secured on the plug-type connection piece 19 such that it is detachable from the outside, so that it can be pulled from the plug-type connection piece 19 after the connection has been loosened.

If further disassembly is desired, the seating device 7 and the back rest device 13 may also be removed from the supporting column 6.

The plug-type connection piece 19 is fixed on the base 2 in a suitable manner. In the presented embodiment, the lower end of the plug-type connection piece 19 has a fastening plate 20 disposed on it, which, in turn, is attached to the base 2. The fastening plate 20 in the shown embodiment is located within the base 2, so that it is not visible from the outside. If the base 2 has a pivoting member 18, like the one in the shown embodiment, the plug-type connection piece 19 is located on the pivoting member.

Both the supporting column 6 as well as the plug-type connection piece 19 are designed as hollow members.

The supporting column 6 is secured on the plug-type connection piece 19 with the aid of bracing means 21 that are supported on the supporting column 6 and extend through the supporting column 6, and which are accessible from the outside. The bracing means 21 engage by contact to the plug-type connection piece 19 and brace the plug-type connection piece to the inside of the supporting column 6.

The bracing means 21 are advantageously formed by at least one tightening screw 22 that exerts pressure against the plug-type connection piece 19. The shown embodiment has two tightening screws 22 that are disposed in the longitudinal direction of the supporting column 6 at a distance to one another. In principle, one such tightening screw may already be sufficient.

The tightening screws 22 are in threaded engagement with the supporting column 6 and can be advanced against the plug-type connection piece 19 to brace the supporting column 6 against the plug-type connection piece 19. To remove the supporting column 6 from the plug-type connection piece 19, the tightening screws 22 are turned in the opposite direction.

For reasons of stability, the supporting column 6 is reinforced at the location of the tightening screws 22. The supporting column 6 may have a stiffening bar 23 for this purpose that is firmly connected to the same by welding and extends at least across the tightening screws 22.

In principle, a plurality of bracing means can be disposed along the circumference. However, it is advantageous if the bracing means 21 are engaged by contact to the plug-type connection piece 19 only from one side (contacted side 24), and the plug-type connection piece 19 is tapered in cross section in its end region 25 opposite the contacted side. The inside of the supporting column 6 tapers in a similar manner in its area adjoining the end region 25 of the plug-type connection piece. During the bracing process, when the bracing means 21 are tightened, the plug-type connection piece 19 is pushed inside the supporting column 6 in the direction of the arrow 26, so that its end region 25 becomes wedged in, so to speak, in the supporting column 6 with its matching tapered cross section. This results not only in a large-surface contact pressing area between the supporting column and plug-type connection piece, but also in a centering of the plug-type connection piece. The arrangement in this respect is symmetrical relative to the section plane II—II.

In the shown embodiment the supporting column 6 has an essentially oval or elliptical cross section and the bracing means 21 are supported on one of the two main apexes, i.e., at the given largest diameter end of the supporting column, advantageously on the rear main apex. The two lateral wall sections 27, 28 of the end region 25 of the plug-type connection piece accordingly are slightly convex so that they hug the inside of the supporting column.

The end region 25 of the plug-type connection piece 19 opposite the contacted side 24 ends at a distance from the facing wall section of the supporting column 6 so that a clearance 29 is located in front of the end of the plug-type connection piece. In this manner the wedge-type bracing process will not be impeded.

A further practical measure consists of the plug-type connection piece 19 having, on its contacted side 24, to both sides of the bracing means 21, a wall section 30, 31 that is slanted or curved in cross section, so that when the bracing means 21 are in operation, i.e., when the tightening screws 22 are exerting pressure in the direction of the arrow 26 onto the contacted side 24, the plug-type connection piece 19 is pushed against the inside of the supporting column 6 on both sides of the bracing means 21 due to the spreading effect. The contacted side 24 of the plug-type connection piece 19 is thus convex or angled towards the bracing means 21 so that the force exerted by the tightening screws 21 pushes the wall sections 30, 31 laterally outward, so that the wall sections 32, 33 of the plug-type connection piece means 19 that adjoin the end wall sections 30, 31 and are that contoured to match the inside of the supporting columns, are pressed against the same. In this manner a stable, non-rocking connection is attained in this embodiment as well, resulting in an altogether stable, immovable connection of the supporting column 6 on the plug-type connection piece 19.

In this context it is advantageous that the plug-type connection piece 19 is slotted longitudinally on its contacted side 24 in the height direction (slot 34). This enhances the spreading effect.

When the tightening screws 22 are being tightened, they can cause the plug-type connection piece 19 to become somewhat indented on its contacted side 24. These indentations present an additional safety measure against an unintentional removal of the supporting column 6 from the plug-type connection piece 19 if the tightening screws 22 should unintentionally become somewhat loose.

Figure 3:
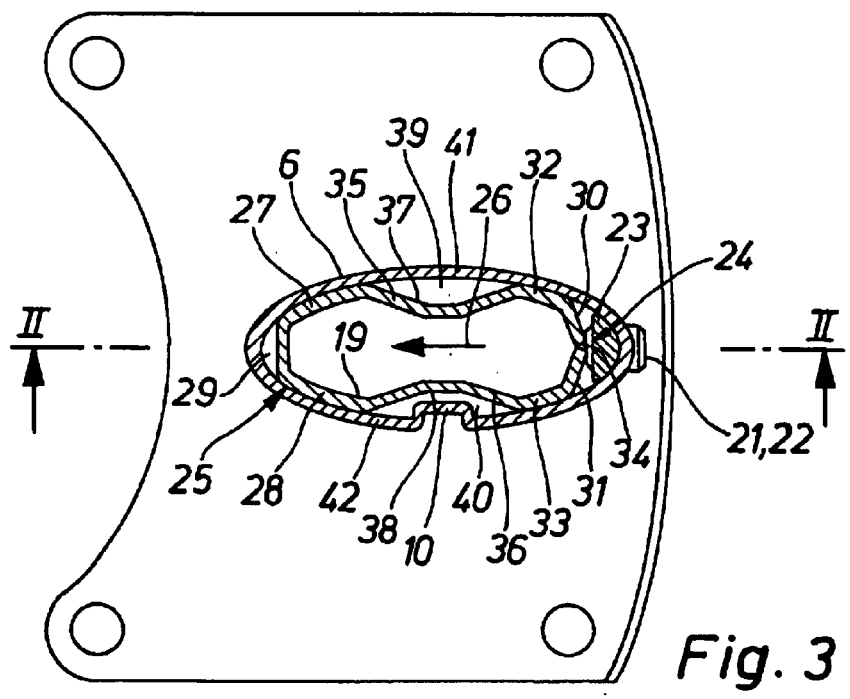
FIG. 3 shows the design according to FIG. 2 in the section along the section line III—III in FIGS. 1 and 2.

From FIG. 3 it is furthermore apparent that the two sides 35, 36 of the plug-type connection piece that extend from the contacted side 24 to the opposite end of the plug-type connection piece 19 are concave in their center region 37 and 38, so that a space and, hence, a clearance 39 and 40 is formed towards the facing wall sections 41, 42 of the supporting column 6.

If these clearances 39, 40 were missing, the sides 35, 36 of the plug-type connection piece would rest against the inside of the supporting column 6 in this center section as well. That would present the risk that the sides of the plug-type connection piece could cause the wall sections 41, 42 of the supporting column 6 to bulge out to some degree when the tightening screws 22 are tightened, due to the spreading effect, so that the exterior shape of the supporting column 6 would widen accordingly, The consequence of this would be, for example, that the seating device 7 could possibly no longer be lowered all the way since the connecting sleeve 11 would not fit over the widened lower end section of the supporting column.

The presented chair is intended specifically also for young people and children, and the seating device 7 is therefore intended to be adjustable all the way down.

Figure 2:
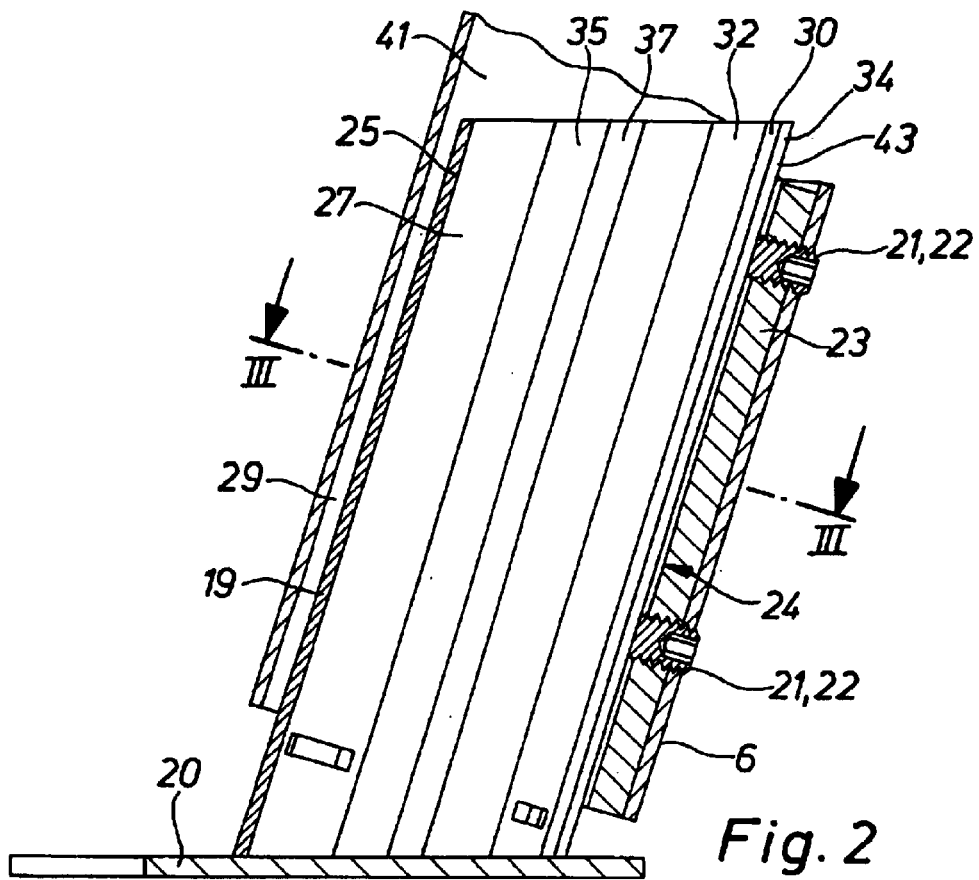
FIG. 2 shows the plug-type connection piece with the slipped on supporting column, which is drawn cut off, in a separate enlarged illustration in a vertical section parallel to the drawing plane of FIG. 1, along the section line II—II in FIG. 3.

The plug-type connection piece 19 is advantageously a bent metal plate. The longitudinal edges 43 of the bent metal plate (the two longitudinal edges are visible in FIG. 3, however, to keep the drawing uncluttered they have not been marked, which means the reference numeral 43 has been entered only in FIG. 2 at the longitudinal edge visible in that figure) are located opposite one another at the longitudinal slot 34, so that the slot 34 is formed by the two longitudinal edges 43. The slot 34 has a wedge shape in cross section that widens towards the bracing means 21.

What is claimed is:

1. A chair having a base and a supporting column upwardly projecting from this base to hold a seating device, specifically in a vertically adjustable manner, characterized in that the base (2) has disposed on it a plug-type connection piece (19) and the supporting column (6) is slipped onto this plug-type connection piece (19), said supporting column being secured on the plug-type connection piece (19) in such a way that it is detachable from the outside, the supporting column (6) is secured on the plug-type connection piece (19) by bracing means (21) that are supported on the supporting column (6) and extend through the same, and that engage by contact to the plug-type connection piece (19) and brace the same to the inside of the supporting column (6), and the bracing means (21) are formed by at least one tightening screw (22) that pushes against the plug-type connection piece (19).

2. A chair according to claim 1, characterized in that the plug-type connection piece (19) is a bent sheet metal component.

3. A chair according to claim 1, characterized in that the bracing means (21) engage by contact to the plug-type connection piece (19) from one side, and the plug-type connection piece (19) has, in its end region (25) opposite the side (24) contacted by the bracing means (21), a shape that tapers in cross section toward its end, and the inside of the supporting column (6) tapers in a similar way, so that the plug-type connection piece (19) becomes wedged inside the supporting column (6) during the bracing process.

4. A chair according to claim 1 or 3, characterized in that the plug-type connection means is hollow and the bracing means (21) engage by contact to the plug-type connection piece (19) from one side and the plug-type connection piece (19) has, on its contacted side (24), a wall section (30, 31) to both sides of the bracing means (21) that is slanted or curved in cross section, so that when the bracing means (21) are in operation, the plug-type connection piece (19) is pushed against the inside of the supporting column on both sides of the bracing means (21) due to a spreading effect.

5. A chair according to claim 4, characterized in that sides (35, 36) of the plug-type connection piece (19) that extend from the contacted side (24) to the opposite end region (25) of the plug-type connection piece (19) are convex in their center region (37, 38), so that a space is created facing wall sections (41, 42) of the supporting column (6).

6. A chair according to claim 3, characterized in that the supporting column (6) has an essentially oval or elliptical cross section, with the bracing means (21) supported on one of the main apexes.

7. A chair according to claim 4, characterized in that the plug-type connection piece (19) is slotted longitudinally on its contacted side (24) in the height direction.

8. A chair according to claim 7, characterized in that sides (35, 36) of the plug-type connection piece (19) that extend from the contacted side (24) to the opposite end region (25) of the plug-type connection piece (19) are convex in their center region (37, 38), so that a space is created facing wall sections (41, 42) of the supporting column (6).

9. A chair according to claim 8, characterized in that the supporting column (6) has an essentially oval or elliptical cross section, with the bracing means (21) supported on one of the main apexes.

10. A chair according to claim 9, characterized in that the bracing means (21) are formed by at least one tightening screw (22) that pushes against the plug-type connection piece (19).

11. A chair according to claim 10, characterized in that the plug-type connection piece (19) is a bent sheet metal component.

12. A chair having a base and a supporting column upwardly projecting from this base to hold a seating device, specifically in a vertically adjustable manner, characterized in that the base (2) has disposed on it a plug-type connection piece (19) and the supporting column (6) is slipped onto this plug-type connection piece (19), said supporting column being secured on the plug-type connection piece (19) in such a way that it is detachable from the outside, the supporting column (6) is secured on the plug-type connection piece (19) by bracing means (21) that are supported on the supporting column (6) and extend through the same, and that engage by contact to the plug-type connection piece (19) and brace the same to the inside of the supporting column (6), the bracing means (21) engage by contact to the plug-type connection piece (19) from one side, and the plug-type connection piece (19) has, in its end region (25) opposite the side (24) contacted by the bracing means (21), a shape that tapers in cross section toward its end, and the inside of the supporting column (6) tapers in a similar way, so that the plug-type connection piece (19) becomes wedged inside the supporting column (6) during the bracing process, and the supporting column (6) has an essentially oval or elliptical cross section, with the bracing means (21) supported on one of the main apexes.

13. A chair having a base and a supporting column upwardly projecting from this base to hold a seating device, specifically in a vertically adjustable manner, characterized in that the base (2) has disposed on it a plug-type connection piece (19) and the supporting column (6) is slipped onto this plug-type connection piece (19), said supporting column being secured on the plug-type connection piece (19) in such a way that it is detachable from the outside, the supporting column (6) is secured on the plug-type connection piece (19) by means of bracing means (21) that are supported on the supporting column (6) and extend through the same, and that engage by contact to the plug-type connection piece (19) and brace the same to the inside of the supporting column (6), the plug-type connection piece (19) is slotted longitudinally on its contacted side (24) in the height direction, and wherein sides (35, 36) of the plug-type connection piece (19) that extend from the contacted side (24) to the opposite end region (25) of the plug-type connection piece (19) are convex in their center region (37, 38), so that a space is created facing wall sections (41, 42) of the supporting column (6).

* * * * *